United States Patent [19]
Wilkening et al.

[11] Patent Number: 5,331,400
[45] Date of Patent: Jul. 19, 1994

[54] HETERODYNE INTERFEROMETER ARRANGEMENT

[75] Inventors: Gunther Wilkening, Braunscheig, Fed. Rep. of Germany; Wenmei Hou, Bern, Switzerland

[73] Assignee: Hewlett-Packard Company, Palo Alto, Calif.

[21] Appl. No.: 888,225

[22] Filed: May 21, 1992

[30] Foreign Application Priority Data

May 24, 1991 [EP] European Pat. Off. ........ 91108444.0

[51] Int. Cl.$^5$ ........................... G01B 9/02; G01B 11/02
[52] U.S. Cl. ..................................... 356/349; 356/351; 356/357
[58] Field of Search ................. 356/349, 351, 357, 358

[56] References Cited

U.S. PATENT DOCUMENTS

| | | | |
|---|---|---|---|
| 4,353,650 | 10/1982 | Sommrgren | 356/351 X |
| 4,553,841 | 11/1985 | Coppa et al. | 356/357 X |
| 4,710,026 | 12/1987 | Magome et al. | 356/363 X |
| 4,711,573 | 12/1987 | Wijntjes et al. | 356/351 X |
| 4,881,815 | 11/1989 | Sommargren | 356/349 |
| 4,886,362 | 12/1989 | Oono | 356/349 |
| 4,948,251 | 8/1990 | Kondo | 356/349 |
| 5,133,599 | 7/1992 | Sommargren | 356/349 |
| 5,139,336 | 8/1992 | See et al. | 356/349 |
| 5,141,317 | 8/1992 | Bollhagen et al. | 356/356 |
| 5,164,789 | 11/1992 | Yoshitake et al. | 356/349 |

OTHER PUBLICATIONS

Precision Engineering, vol. 12, No. 1, Jan. 1, 1990, pp. 7–11; A Rosenbluth et al.: "Optical Sources of Non–Linearity" pp. 7–10.
Journal of Vacuum Science & Technology B, vol. 8, No. 1, Dec. 1, 1990 New York, pp. 2032–2036; W. Augustyn: "An Analysis of Polarization Mixing Errors" pp. 2034–2036.
Journal of Physics E: Scientific Instruments, vol. 20, No. 10, Oct. 1, 1987, pp. 1290–1292; C. Sutton: "Non–Linearity in Length Measurement" pp. 1290–1292.
Applied Optics, vol. 26, No. 13, Jul. 1, 1987, pp. 2676–2682; N. Bobroff: "Residual Errors in Laser Interferometry", pp. 2677–2680.
Patent Abstracts of Japan, vol. 12, No. 319 (P-751) (3166) Aug. 30, 1988 & JP-A-63 085 302 (Hoya Corp.) Apr. 15, 1988 "abstract".

Primary Examiner—Robert J. Warden
Assistant Examiner—Robert Carpenter

[57] ABSTRACT

A heterodyne interferometer arrangement comprises a two-frequency light source, an optical reference branch for producing a reference signal, an optical measuring branch, which includes an interferometer unit causing a phase rotation of the light beams in response to a length to be measured, as well as a measuring transducer arranged at the output of the interferometer unit, and a phase comparator arranged subsequent to the reference transducer and the measuring transducer. In order to minimize linearity errors, the measuring transducer comprises first and second optoelectric measuring transducer units, which respond to light components orthogonal to each other and which are followed by two phase comparators whose output signals represent phase differences between the first or the second measuring signal on the one hand and the reference signal on the other, and a mean value generation circuit whose output signal represents the mean value of the first and second phase differences. The mean value of the phase differences is virtually free from non-linearity.

7 Claims, 6 Drawing Sheets

(a)

(b)

(c)

$(\delta\Delta\varphi_1)_{max} = 8.5°$ ( 7.7 nm )
$(\delta\Delta\varphi_2)_{max} = 9.6°$ ( 8.6 nm )
$(\delta\Sigma)_{max} = 1.3°$ ( 1.2 nm )

$(\delta\Delta\varphi_1)_{max} = 31.2°$ ( 27.1 nm )
$(\delta\Delta\varphi_2)_{max} = 34.0°$ ( 29.6 nm )
$(\delta\Sigma)_{max} = 5.1°$ ( 4.4 nm )

HETERODYNE INTERFEROMETER ARRANGEMENT

BACKGROUND OF THE INVENTION

The present invention relates to a heterodyne interferometer arrangement, a heterodyne interferometric metering method, and an arrangement for detecting the non-linearity of a heterodyne interferometer, as well as a method of detecting the non-linearity of a heterodyne interferometer.

The basic set-up of a heterodyne interferometer arrangement, which is also referred to as a two-frequency interferometer arrangement, is shown in FIG. 18. The heterodyne interferometer arrangement as a whole is indicated by reference numeral 1 and includes a light source LS for generating light beams $E_1$, $E_2$ having a first frequency $f_1$ and a second frequency $f_2$. The two beams produced by the light source LS can be described as plane waves, which can be expressed by the following equations:

$$E_1 = E_0 \sin(2\pi f_1 t + \phi_{01}) \quad (1a)$$

$$E_2 = E_0 \sin(2\pi f_2 t + \phi_{02}) \quad (1b)$$

In the light path after the light source LS, a first beam splitter BS1 is arranged, said beam splitter supplying the light produced by the light source LS to an optical reference branch RB on the one hand and to an optical measuring branch MB on the other. An interferometer unit IF having a structure which is known per se is arranged after the first beam splitter BS1 in the measuring branch MB, said interferometer unit IF including, in turn, a first polarizing beam splitter PB1 followed by first and second interferometer arms A1, A2 in orthogonal directions. As is, in principle, known to the person skilled in the art, each interferometer arm A1, A2 is terminated by a mirror MR1, MR2, which can, for example, be formed by a prism. The two interferometer arms A1, A2 have a first optical length $n_1 \cdot l_1$ and a second optical length $n_2 \cdot l_2$. At least one of the two interferometer arm lengths corresponds to the quantity to be measured by the heterodyne interferometer arrangement.

At the optical output of the interferometer unit IF, a first polarization filter PF1 is arranged whose polarizing direction is rotated by 45° relative to the directions $M_1$, $M_2$ of the two plane waves $E_1$, $E_2$. An optoelectric measuring transducer unit in the form of a photodiode $D_m$ is arranged after this first polarization filter PF1.

A second polarization filter PF2 is arranged in the reference branch RB in the light path after the first beam splitter BS1, the polarization direction of said second polarization filter being, just like that of the first polarization filter PF1, rotated by 45° relative to the directions $M_1$, $M_2$ of the two plane waves $E_1$, $E_2$. The second polarization filter PF2 is followed by an optoelectric reference transformer means in the form of a photodiode $D_r$. The reference signal $I_r$ produced by this photodiode $D_r$ satisfies the following equation:

$$I_r \sim E_r^2 \sim I_0 \cos[2\pi(f_1 - f_2)t + \phi_0] \quad (1c)$$

In this connection, the following relationship exists with regard to the amplitude $I_0$:

$$I_0 \sim E_0^2 \quad (1d)$$

With regard to the constant phase displacement $\phi_0$, the following connection exists:

$$\phi_0 = \phi_{r1} - \phi_{r2} \quad (1e)$$

The measuring signal $I_m$ at the output of the optoelectric measuring transducer unit $D_m$ is defined in accordance with the following equation:

$$I_m \sim I_0 \cos[2\pi(f_1 - f_2)t + \phi_{0m} + \Delta\phi] \quad (2a)$$

In this equation, $\Delta\phi$ represents a phase displacement which can be expressed as follows:

$$\Delta\phi = \phi_1 - \phi_2 = 4\pi(n_1 l_1 - n_2 l_2)/\lambda_m \quad (2b)$$

In this equation, $\lambda_m$ represents the mean wavelength. An arbitrary initial phase is $\phi_{0m} = \phi_{m1} - \phi_{m2}$.

The measuring signal $I_m$ and the reference signal $I_r$ are supplied to a phase comparison circuit PH, which will form the phase difference between the measuring signal $I_m$ and the reference signal $I_r$.

As can be seen from equations (1c), (2a) and (2b), the measuring signal $I_m$ is subjected to a phase displacement in comparison with the reference signal $I_r$, said phase displacement changing in response to changes in the optical path lengths $n_1 \cdot l_1$ and $n_2 \cdot l_2$ in the first and second arms A1, A2 of the interferometer unit IF. Hence, a length variation in one of the two arms A1, A2 can be detected by measuring a resultant phase difference between $I_m$ and $I_r$.

If, in the case of one example, the resolution which can be achieved when carrying out a phase measurement is 1°, a length resolution of 0.9 nm can be attained for the detection of the displacement of a mirror MR1 and MR2, respectively, in the case of the interferometer shown in FIG. 18. The above-described phase displacement $\Delta\phi$ between the reference signal $I_r$ and the measuring signal $I_m$ is shown in FIG. 19. FIG. 20 shows the above-described orthogonal direction of the two partial beams $E_1$, $E_2$, as well as the arrangement of the polarization filters PF1, PF2 which are displaced by 45° relative thereto.

However, the above-described derivation of the connection between the phase displacement $\Delta\phi$ and a length $L_1$, $L_2$ to be measured is only applicable under the ideal condition that only one of the two frequencies $f_1$, $f_2$ occurs in each interferometer arm A1, A2. This ideal condition is, however, not met in practice. Due to various influences, mixed frequencies are found in both interferometer arms A1, A2. The causes of such frequency mixtures are, for example, non-orthogonality of the polarization directions $M_1$, $M_2$ of the incident waves $E_1$, $E_2$, mixing due to elliptic polarization of the incident waves $E_1$, $E_2$, mixing due to imperfect optics in the light path before the first polarizing beam splitter PB1 as well as incomplete frequency separation by said first polarizing beam splitter PB1.

These errors result in a non-linear relation between the measured phase difference and the displacement to be measured or the change in the optical length of one of the two interferometer arms to be measured.

The following literature sources are cited with regard to the technological background of the present invention:

Sommargren, G. E.:

A new measurement system for precision metrology

Prec. Eng. 9 (1987), 179–184
Quenelle, R. C.; Wuerz, L. J.:
A new micrometer-controlled laser dimensional measurement and analysis system.
Hewlett-Packard Journ. 34,4 (1983), 3–13
Dorenwendt, K.; Probst, R.:
Hochauflösende Interferometrie mit Zweifrequenzlasern
PTB-Mitt. 90, (1980), 359–362
Reinboth, F.; Wilkening, G.:
Optische Phasenschieber für Zweifrequenz-Laser-Interferometrie
PTB-Mitt. 93, (1983), 168–174
Bobroff, N.:
Residual errors in laser interferometry from air turbulence and nonlinearity
Appl. Opt. 26, (1987), 2676–2682
Sutton, C. M.:
Non-linearity in length measurement using heterodyne laser Michelson interferometry
J. Phys. E 20, (1987), 1290–1292
Steinmetz, C. R.:
Sub-micron position measurement and control on precision machine tools with laser interferometry
Prec. Eng. 12, (1990), 12–24
Rosenbluth, A. E.; Bobroff N.:
Optical sources of non-linearity heterodyne interferometers
Prec. Eng. 12, (1990), 7–11

In view of this prior art, it is desirable to further develop a heterodyne interferometer arrangement, as well as a heterodyne interferometric metering technique, in such a way that the measuring linearity error is reduced.

SUMMARY OF THE INVENTION

This object is achieved by a heterodyne interferometer arrangement according to one embodiment of the invention and by a heterodyne interferometric metering method in accordance with the invention.

In view of the fact that, in the case of known heterodyne interferometer arrangements and in the case of known heterodyne interferometric metering techniques, linearity errors will occur, as has already been explained hereinbefore, when the phase difference is being measured in response to a displacement of the interferometer arm, it will be important to know the magnitude of the linearity error. Up to now, the linearity error of a heterodyne interferometric metering technique has been determined by comparing the phase characteristic during the measurement of a heterodyne interferometer arrangement to be tested with the phase characteristic of a reference interferometer. This type of check is complicated on the one hand and affected by errors of the reference interferometer on the other.

It follows that, in accordance with the invention, the present invention is based on the object of providing a simplified arrangement for detecting nonlinearity of a heterodyne interferometer arrangement, as well as a simplified method of detecting the linearity of a heterodyne interferometer.

This object is achieved by a non-linearity detection arrangement and by a non-linearity detection method.

BRIEF DESCRIPTION OF THE DRAWINGS

In the following, preferred embodiments of the present invention will be explained in detail while making reference to the accompanying drawings, in which

FIG. 1 shows the non-ideal case that the two polarizing directions of the incident radiation $E_1$, $E_2$ are not orthogonal to each other at the first and second frequencies $f_1$, $f_2$, respectively, so that frequency mixing will occur in the interferometer arms A1, A2 shown in FIG. 18. The deviation of the two polarization directions from orthogonality can be denoted $\alpha$. As a result, in addition to the radiation component having the first frequency $f_1$, part of the radiation having the frequency $f_2$ will also enter the first interferometer arm A1 in the direction towards the first mirror MR1. The resultant radiation in this plane of polarization can be expressed as follows:

Figure 1:
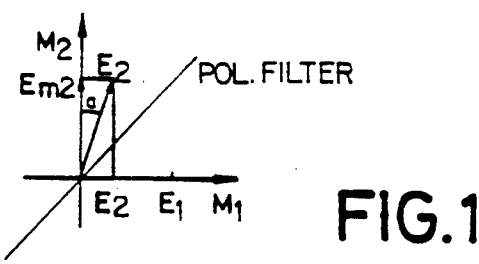
FIG. 1 shows a representation of the plane light waves in the case of non-orthogonality for explaining the frequency mixing which results therefrom.
Figure 2:
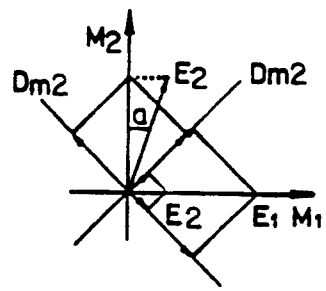
FIG. 2 shows a representation of the light beam components.

$$E_{m1} = E_0 \sin(2\pi f_1 t + \phi_{01} + \phi_1) + E_0 \sin\alpha \sin(2\pi f_2 t + \phi_{02} + \phi_1) \quad (3a)$$

Accordingly, the radiation component, which is orthogonal to the above radiation and which enters the second interferometer arm A2, can be expressed as follows:

$$E_{m2} = E_0 \cos\alpha \sin(2\pi f_2 t + \phi_{02} + \phi_2) \quad (3b)$$

The following relation then results for the measuring signal $I_m$, which corresponds to the a.c. output signal of the measuring photodiode $D_m$:

$$I_m = A^* I_0 \cos[2\pi(f_1 - f_2)t + \phi_{0m} + \Delta\phi - \gamma] \quad (3c)$$

$$\gamma = tg^{-1} \frac{\sin\alpha \sin\Delta\phi}{\cos\alpha + \sin\alpha\cos\Delta\phi} \quad (4)$$

$$A^* = \sqrt{1 + \sin 2\alpha \cos\Delta\phi} \quad (5)$$

On condition that $\alpha$ is much smaller than 1, said condition being fulfilled in the case of the relation $\alpha < 5°$, the systematic phase error $\gamma$ can be expressed by the following equation in first approximation.

$$\gamma \approx \alpha \sin\Delta\phi \quad (6)$$

Figure 18:
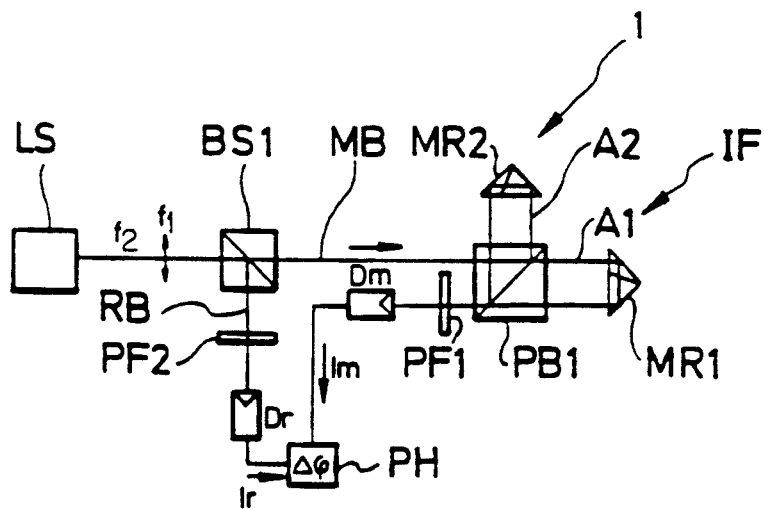
FIG. 18 shows a schematic circuit diagram of a known interferometer.
Figure 19:
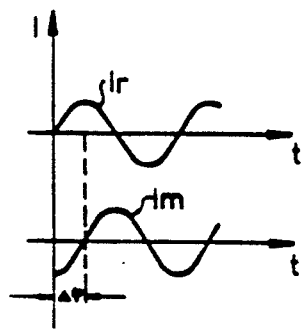
FIG. 19 shows a graphic representation of the variation with time of a reference signal and of a measuring signal in the case of the interferometer arrangement according to FIG. 18.
Figure 20:
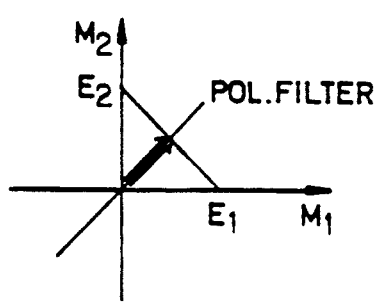
FIG. 20 shows a representation of the idealized orthogonal position of the two plane waves and of the position of the polarization filters in the case of the interferometer arrangement shown in FIG. 18.

A comparison between equations (2b) and (3c) indicates that the phase measurement carried out by means of the known interferometer arrangement shown in FIG. 18 is affected by a systematic error $\gamma$, said systematic error $\gamma$ being a periodic error which varies with the phase difference $\Delta\phi$. The maximum error is $2\alpha$. If $\alpha = 5°$, for example, the maximum error of phase measurement will be $10°$. This corresponds to an error of 9 nm in the length measurement in the case of the heterodyne interferometer according to the prior art which has been described.

It should also be noted that the amplitude of the measuring signal $I_m$ is no longer constant, in contrast to the ideal case (cf. equation (2a)), but represents a periodic signal modulated by $\alpha$ and $\Delta\phi$ (cf. equation (5)).

Also, the other causes of error, which have been mentioned and in view of which mixing occurs, cause similar results. When there is frequency mixing in both arms, the phase errors behave additively. But a simple rotation of the polarization directions of the incident light wave relative to those of the interferometer theoretically do not cause first order phase errors.

Mixing errors due to leakage of the first polarizing beam splitter PB1 can mostly be neglected, because the leakage flux retains its polarization and must pass the first polarizing beam splitter PB1 at least once more before mixing of the leakage flux can take place at the location of the receiver. The first polarizing beam splitter PB1 typically has a rejection ratio of 0.3% in intensity. The resulting phase error leads to a maximum error in the length measurement of 0.17 nm in the case of the heterodyne interferometer arrangement shown in FIG. 18 and 0.001 nm for differential interferometers.

Non-ideal non-polarizing or polarizing optics behind the first polarizing beam splitter PB1 do not cause the error of non-linearity.

In the case of the heterodyne interferometric metering method according to the present invention, two measuring signals $I_{m1}$ and $I_{m2}$ are produced, which represent light components orthogonal to each other at the output of the interferometer unit. The following equations are obtained for the two measuring signals:

$$I_{m1} = I_m \sim A^* I_0 \cos[2\alpha(f_1 - f_2)t + \phi_{0m} + \Delta\phi - \gamma] \quad (7)$$

$$I_{m2} \sim -B^* I_0 \cos[2\pi(f_1 - f_2)t + \phi_{0m} + \Delta\phi + \gamma'] \quad (8)$$

The negative sign in equation (8) for the second measuring signal $I_{m2}$ corresponds to a constant phase displacement of $\pi$ relative to the first measuring signal $I_{m1}$, and that has no influence on phase measurement. In equation (8), the following relationships exist:

$$B^* = \sqrt{1 - \sin 2\alpha \cos\Delta\phi} \quad (9)$$

$$\gamma' = tg^{-1} \frac{\sin\alpha \sin\Delta\phi}{\cos\alpha - \sin\alpha\cos\Delta\phi} \quad (10)$$

On the basis of an approximation, which corresponds to the approximation described with reference to equation (6), the following relationship between the two deviations of linearity of the two measuring signals $I_{m1}$, $I_{m2}$ is obtained:

$$\gamma' \approx \alpha \sin\Delta\phi \approx \gamma \quad (11)$$

It can be seen that the two measuring signals $I_{m1}$, $I_{m2}$ have opposite deviations of linearity. When it is assumed that $$\Delta\phi_1 = \phi_{0m} + \Delta\phi - \gamma \quad (12)$$

$$\Delta\phi_2 = \phi_{0m} + \Delta\phi - \gamma' \quad (13)$$

the following connection will be obtained provided that $\alpha < 1$:

$$\Delta\phi_2 - \Delta\phi_1 = \gamma' + \gamma \quad (14)$$

$$\gamma' + \gamma = \sin^{-1} \frac{\sin 2\alpha \sin\Delta\phi}{\sqrt{1 - \sin^2(2\alpha)\cos^2(\Delta\phi)}} \approx 2\alpha \sin\Delta\phi \quad (15)$$

Figure 3:
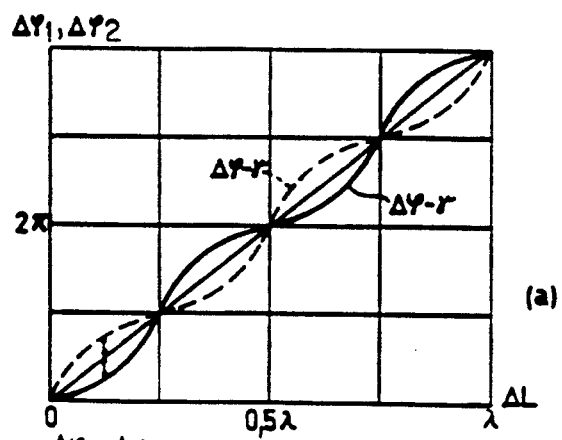
FIG. 3 shows a representation of the periodic, nonlinear phase characteristic of the measuring signal depending on a displacement to be measured.
Figure 5:
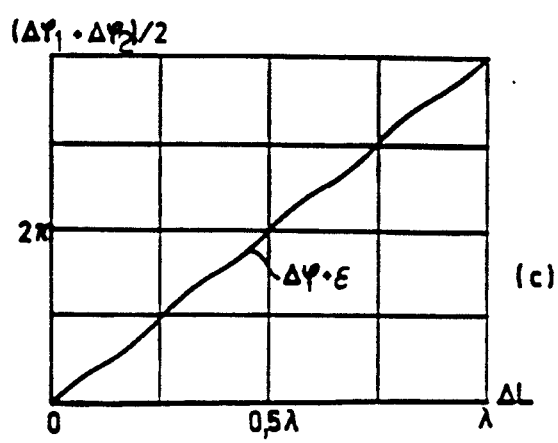
FIG. 5 shows a representation of the phase characteristic with compensated linearity error in the case of the heterodyne interferometer arrangement according to the present invention, as well as in the case of one embodiment of the heterodyne interferometric metering method according to the present invention.

FIG. 5 shows a graph of the arithmetic mean of the phase displacement $\Delta\phi_1$ of the first measuring signal $I_{m1}$, as well as of the phase displacement $\Delta\phi_2$ of the second measuring signal $I_{m2}$ in response to the length variation $\Delta L$ to be detected. When this graph is compared with the non-compensated graph shown in FIG. 3, it will become evident that, with the exception of a residual error, the periodic linearity error has been compensated almost completely.

Figure 4:
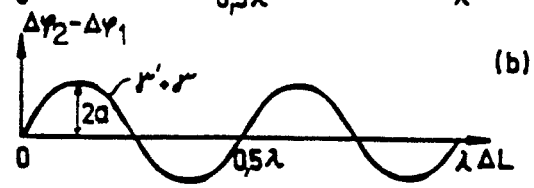
FIG. 4 shows a representation of the linearity error depending on the displacement to be measured.

In the case of the method of detecting the non-linearity of a heterodyne interferometer according to the present invention, the first and second measuring signals $I_{m1}$, $I_{m2}$, which have already been mentioned and which represent two light components orthogonal to each other at the output of the heterodyne interferometer, are produced, whereupon the phase difference between these measuring signals is detected, without there being any necessity of carrying out a comparison of said measuring signals with a reference signal for the method of measurement according to the present invention. Nor is it necessary to carry out a comparison with a reference interferometer for the purpose of detecting non-linearity. The phase difference calculated is shown in FIG. 4, whereas FIG. 7 shows the phase difference measured in the case of the embodiment of a non-linearity measuring arrangement according to FIG. 6, which will be described hereinbelow. In both cases, the amplitude of the periodic phase difference signal represents the maximum non-linearity error.

Figure 6:
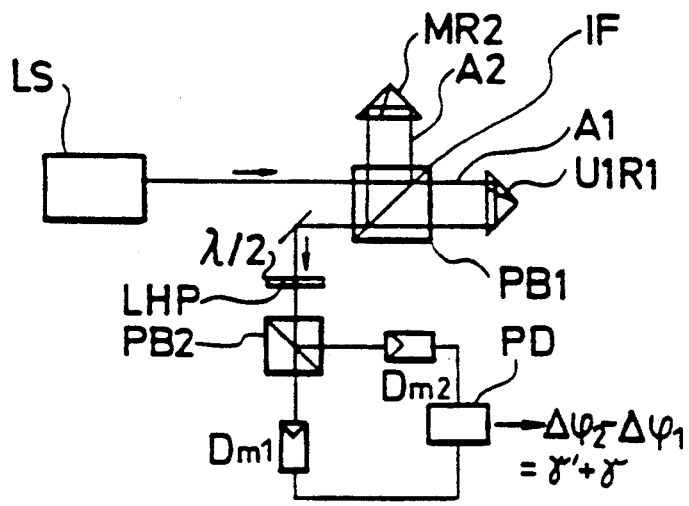
FIG. 6 shows an arrangement for detecting the linearity error of a heterodyne interferometer.
Figure 7:
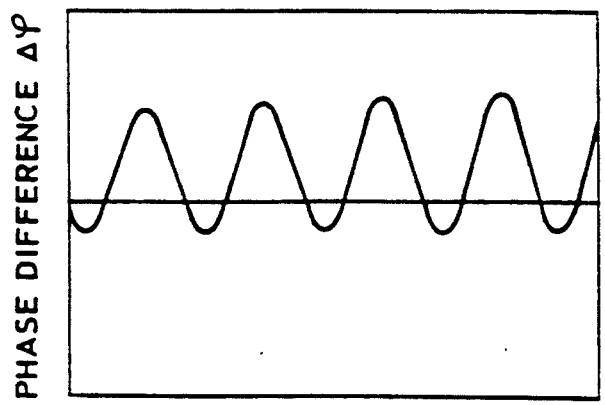
FIG. 7 shows a representation of the linearity error.

Referring to FIG. 6, an arrangement for detecting the non-linearity of a heterodyne interferometer according to the invention serves to check heterodyne interferometers according to the prior art whose structure is known per se. Said structure comprises a light source LS and an interferometer unit IF; these are components which have already been explained with regard to FIG. 18. At the output of the interferometer unit IF a $\lambda/2$ plate LHP is arranged, said plate being used for effecting rotation of the polarization direction by 45°. A second polarizing beam splitter PB2 is provided in the beam path behind said plate. By means of the combined effect of said $\lambda/2$ plate LHP and of the second polarizing beam splitter PB2, orthogonal components of the light at the output of the interferometer unit IF are supplied to first and second optoelectric measuring transducer units $D_{m1}$, $D_{m2}$, which can be photodiodes. The output signals of these measuring transducer units are supplied to a phase difference circuit PD, which will form the phase difference as defined in equations 14 and 15.

In the following, the residual error occurring in the case of the heterodyne interferometric metering method according to the present invention is to be determined. It can be obtained from equations 12 and 13:

$$(\Delta\phi_1 + \Delta\phi_2)/2 = \Delta\phi + \epsilon \qquad (16)$$

and $$\begin{aligned}
\epsilon &= (\gamma' - \gamma)/2 \\
&= \frac{1}{2}\sin^{-1}\frac{\sin 2\alpha \sin(2\Delta\phi)}{\sqrt{1 - \sin^2(2\alpha)\cos^2(\Delta\phi)}} \\
&\approx \frac{1}{2}\alpha^2\sin(2\Delta\phi) \quad (\text{if } \alpha << 1)
\end{aligned} \qquad (17)$$

Figure 8:
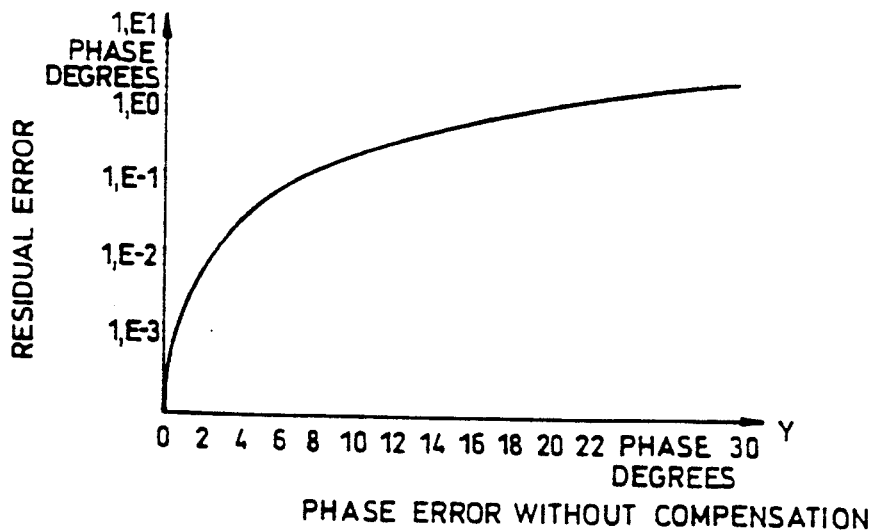
FIG. 8 shows a graphic representation of the residual error in the case of the compensation carried out according to the invention in response to the phase error, which occurs without the compensation according to the invention.

As can be seen in FIG. 8, the residual error $\epsilon$ is negligible so that the measured value obtained by forming the mean value of the phase differences in the case of the interferometric metering method according to the present invention is virtually free from non-linearity.

It is, however, emphasized that in the case of the heterodyne interferometric metering method according to the invention, the two measuring signals $I_{m1}$, $I_{m2}$ cannot directly be related with each other for forming the mean value of the phases, because the amplitudes of these measuring signals are no longer constant and have opposite phases so that an error would be caused if a simple phase addition were carried out. As has already been mentioned, it will be necessary to compare the two orthogonal measuring signals $I_{m1}$, $I_{m2}$ separately with the reference signal $I_r$ and then form the arithmetic mean value of the resultant phase differences.

Figure 9:
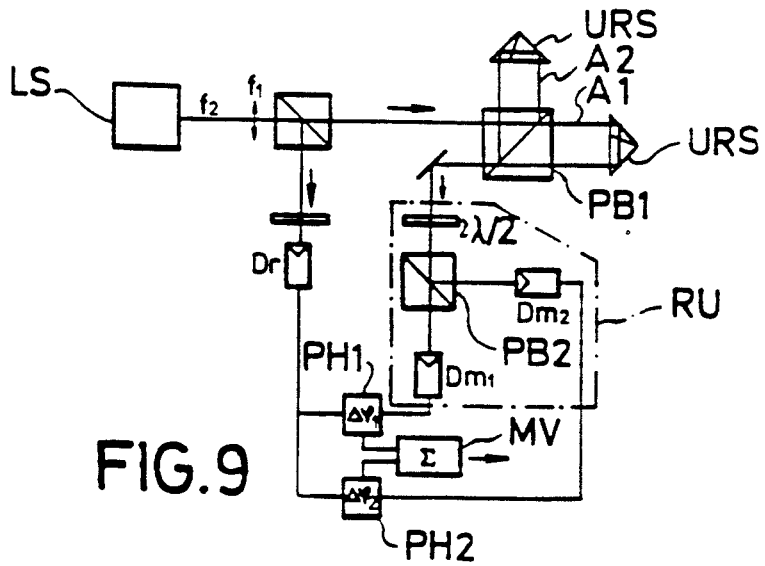
FIG. 9 shows an embodiment of the heterodyne interferometer arrangement according to the invention.

A heterodyne interferometer arrangement suitable for carrying out the heterodyne interferometric metering technique according to the invention is shown in FIG. 9.

As far as the arrangement according to FIG. 9 corresponds to the arrangement according to the prior art according to FIG. 18, which has already been described, identical or similar parts will be provided with identical reference numerals so that a renewed explanation of these components can be dispensed with.

In the case of the heterodyne interferometer arrangement according to the present invention, the output of the interferometer unit has connected thereto a receiver unit RU, which generally divides the emergent light into two orthogonal light components and which supplies these components to first and second optoelectric measuring transducer units $D_{m1}$, $D_{m2}$ so as to produce first and second measuring signals $I_{m1}$, $I_{m2}$, respectively; said optoelectric measuring transducer units can comprise photodiodes. The output signals of these measuring transducer units $D_{m1}$, $D_{m2}$ are supplied to first and second phase comparator units PH1, PH2 whose reference input has applied thereto the reference signal $I_r$. The resultant two phase difference signals $\Delta\phi_1$, $\Delta\phi_2$ at the respective outputs of the phase comparator units PH1, PH2 are supplied to a mean value generation circuit MV, which will form the arithmetic mean value of the two phase differences.

The receiver unit for a heterodyne interferometer arrangement according to the invention can be realized in different ways. Three possible embodiments are shown in FIGS. 10, 11 and 12.

A feature which is common to all embodiments of this receiver unit RU is that the light wave from the output of the interferometer unit IF is subdivided into two light components, which are orthogonal to each other and which are supplied to first and second optoelectric measuring transducer units $D_{m1}$, $D_{m2}$.

Figures 10, 11, 12:
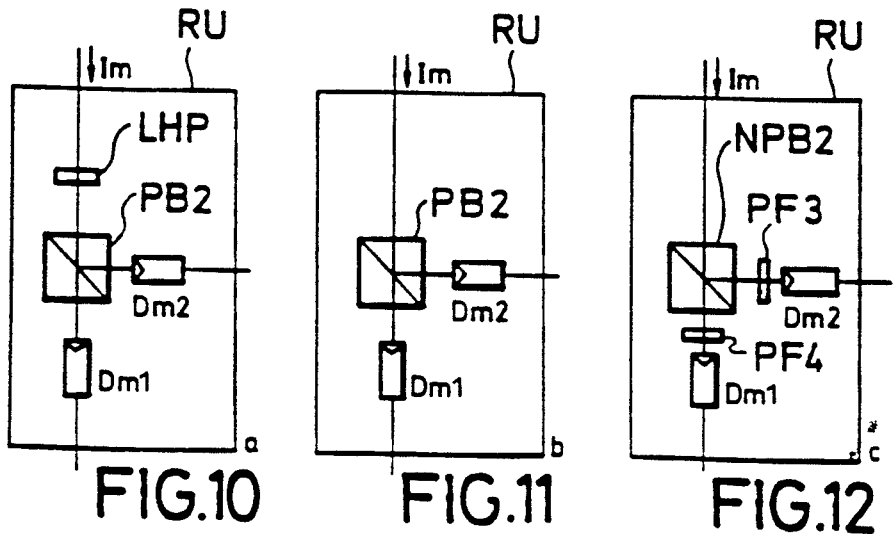
FIGS. 10, 11 and 12 show receiver components of the heterodyne interferometer arrangement according to the invention.

The structural design of the receiver unit according to FIG. 10 corresponds to the relevant arrangement of FIG. 9. It should also be noted that, in the case of the structure of FIG. 10, the second polarizing beam splitter PB2 corresponds with regard to its polarization direction to the axes $M_1$, $M_2$ of the wave originating from the interferometer unit IF.

In contrast to the above, the embodiment according to FIG. 11 is constructed such that the second polarizing beam splitter PB2 is rotated by 45° relative to the main axes $M_1$, $M_2$ so that the $\lambda/2$ plate LHP of the embodiment according to FIG. 10 can be dispensed with.

In the case of the embodiment according to FIG. 12, a non-polarizing beam splitter NPB2 is used instead of a polarizing beam splitter, the split light beams being caused to pass through third and fourth polarization filters PF3, PF4, respectively—which are displaced by 90° relative to each other—prior to impinging on the first or the second optoelectric measuring transformer unit $D_{m1}$, $D_{m2}$.

Figure 13:
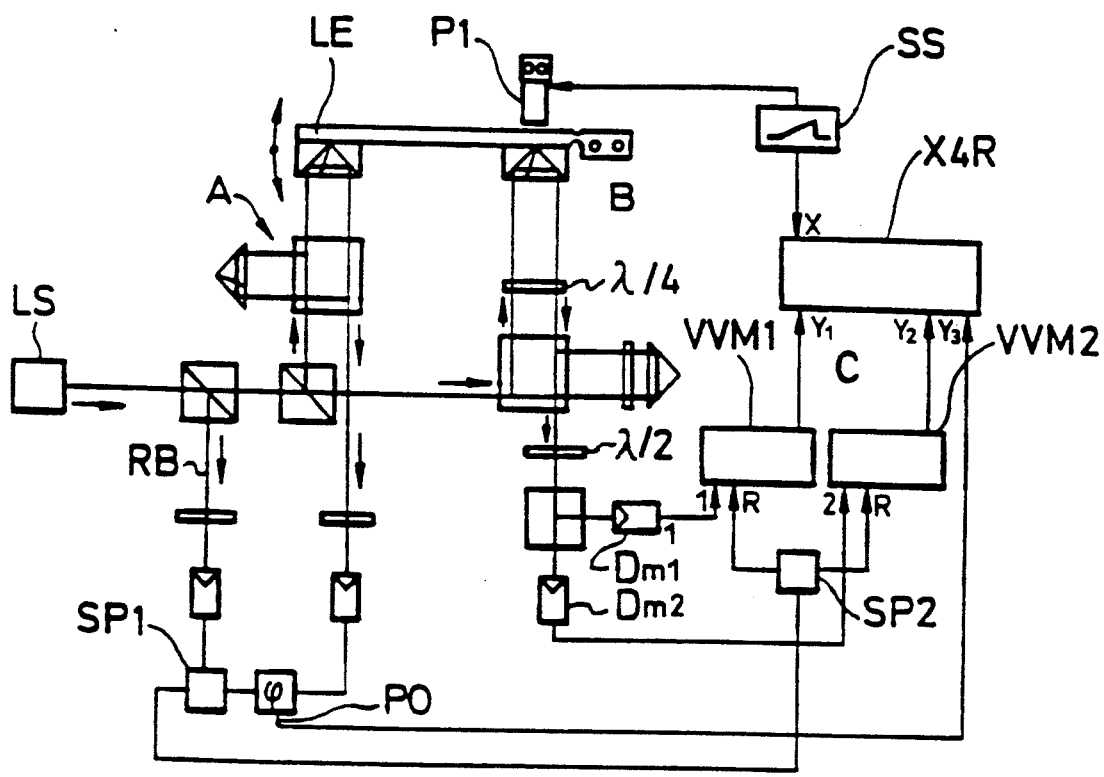
FIG. 13 shows a measuring set-up for checking the method according to the invention.
Figures 14, 16:
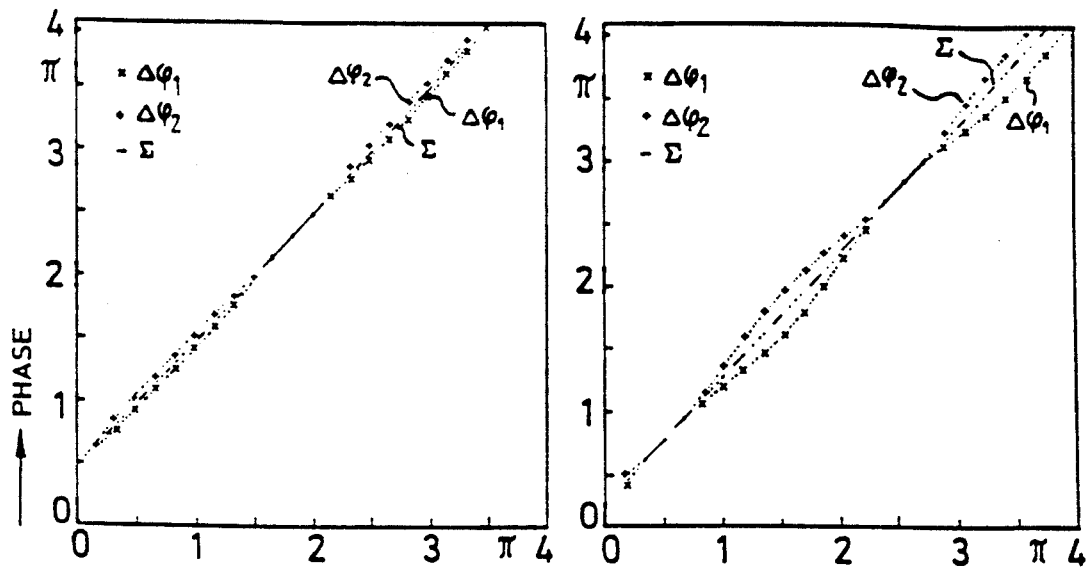
FIGS. 14 to 17 show phase characteristics and phase error characteristics, respectively.

FIG. 13 shows an experimental set-up for the detection and compensation of non-linearities in the case of a heterodyne interferometer arrangement. As will be described hereinbelow, this experimental set-up is adapted to be used for proving the correctness of the theoretical derivation, which was carried out earlier and which underlies the present invention.

In FIG. 13, reference numeral A generally refers to a reference interferometer arrangement, whereas reference numeral B is used for a heterodyne interferometer arrangement according to the invention having a structure which corresponds essentially to the structure shown in FIG. 9. The structure of the reference interferometer arrangement essentially corresponds to the known structure shown in FIG. 18. To the person skilled in the art, it will be obvious that both interferometer arrangements A, B have applied thereto coherent light with two frequencies which comes from a common light source LS. The light source used can be a two-frequency laser.

For reasons of simplification, both interferometer arrangements A, B operate with a common reference branch RB. The interferometer-arms, which form parts of the two interferometer arrangements and which are variable in length, are secured to a lever LE whose geometry is chosen such that the length variation of the variable interferometer arm of arrangement A is fifteen times as large as that of arrangement B. The displacement of the interferometer arm of the heterodyne interferometer arrangement B to be examined is effected by means of a piezoelectric element PI in accordance with a ramp-shaped control signal, which comes from a signal source SS and which is supplied to an X-Y plotter as the X signal. The zero passages of the phase output PO of the reference interferometer A furnish equidistant subdivisions for the displacement or variation in length of the interferometer B to be examined. The periodical integer phase is not influenced by potential non-linearities.

The phase cycle of interferometer B is provided with 15 equidistant marks, and the phase displacements $\Delta\phi_1$ and $\Delta\phi_2$ are measured at these marks.

The outputs of the optoelectric measuring transducer units $D_{m1}$, $D_{m2}$ of the interferometer B to be examined respectively define a first input of first and second vector voltmeters VVM1, VVM2 whose respective other input has applied thereto the reference signal via signal dividers SP1, SP2. Said reference signal is also supplied to the X-Y plotter XYR as $y_3$ input. The two vector voltmeters VVM1, VVM2 constitute the phase comparator units of the interferometer arrangement B according to the invention which is to be checked. The output signals of these phase comparator units are supplied to the X-Y plotter XYR as $y_1$ input and as $y_2$ input.

Figures 15, 17:
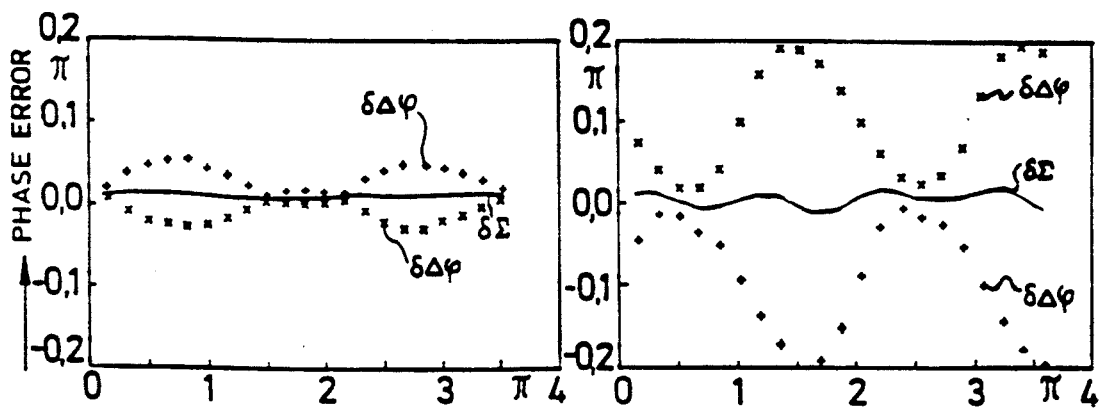

FIGS. 14 to 17 show typical measurement results. The measured phase values $\Delta\phi_1$, $\Delta\phi_2$ as well as the mean values, are plotted as a function of the displacement in FIGS. 14 and 16 for two different examination arrangements. FIGS. 15 and 17 show the associated linearity errors or phase errors without compensation, as well as with the compensation on the basis of the method of measurement according to the present invention.

The following conclusions, which confirm the theory underlying the invention, can be drawn from the measurements:

The traces of the two phase outputs $\Delta\phi_1$ and $\Delta\phi_2$ show sinusoidal deviations from linearity.

The deviations from linearity are opposite in phase.

The arithmetic mean value indicates a clear improvement in linearity.

The residual non-linearity decreases with decreasing phase errors.

Constant phase components such as shift in the direction of the ordinate, do not influence linearity.

It will be understood that the embodiments of the present invention described above are susceptible to various modifications, changes, and adaptations. All is intended to be comprehended within the meaning and range of equivalents of the appended claims.

What is claimed:

1. A heterodyne interferometer arrangement comprising:
    a light source for producing light beams having a phase and first and second frequencies, respectively;
    a first splitter coupled to receive said light beams and operative to divide said light beams into first and second beams;
    an optical reference branch, which includes a reference transducer being operative to receive the first beam for producing a reference signal representing the phase of the first beam;
    an optical measuring branch, which is coupled to receive the second beam and which includes an interferometer unit; wherein said interferometer unit further comprises two paths, each having a respective optical path length; one path for transmitting a portion of said second beam having the first frequency and the other path for transmitting a portion of the second beam having the second frequency; the interferometer unit being so arranged and constructed that after respective portions of the second beam have traversed the two paths and subsequently have been recombined, a resulting optical measuring beam is produced with a phase which is proportional to any change in optical path length occurring between the two paths; said change in optical path length representing a change in a displacement to be measured;
    a second splitter coupled to receive and divide the optical measuring beam into two orthogonal light beams each having components which are orthogonal to one another;
    a measuring transducer including first and second optoelectric measuring transducer units which respond respectively to the two orthogonal light beams to produce first and second measuring signals;
    a phase comparator unit comprising first and second phase comparators, the first phase comparator being responsive to the first measuring signal and the reference signal to produce a first phase comparator signal representing a phase difference between the first measuring signal and the reference signal, the second phase comparator being responsive to the second measuring signal and the reference signal to produce a second phase comparator signal representing a phase difference between the second measuring signal and the reference signal; and
    a mean value generation circuit which is arranged to respond to said first and second phase comparator signals for producing an output signal representing a mean value of said first and second phase comparator signals whereby non-linearity errors in the interferometer unit are substantially eliminated.

2. A heterodyne interferometer arrangement according to claim 1, further comprising
    a polarization direction rotating device arranged to receive the optical measuring beam and to produce therefrom a polarized optical measuring beam;
    wherein said second splitter is a polarizing beam splitter having a polarization direction and is coupled to receive the polarized optical measuring beam and operating for supplying the two orthogonal light beams each having a direction of polarization; and
    the polarization direction of the polarizing beam splitter corresponds to the direction of one of the orthogonal light beams.

3. A heterodyne interferometer arrangement according to claim 1, wherein
    the orthogonal light beams each have a direction of polarization and the second beam splitter is a polarizing beam splitter having a polarization direction which is rotated by 45° relative to the direction of the orthogonal light beams.

4. A heterodyne interferometer arrangement according to claim 1, wherein the second beam splitter comprises a non-polarizing beam splitter and two polarization filters which are displaced by 90° relative to each other with regard to their polarization directions and which are used for filtering out the orthogonal light components of the orthogonal light beams.

5. A heterodyne interferometric metering method comprising the steps of:

producing a reference signal representing a reference phase of light beams having first and second frequencies, respectively, at an input of an interferometer unit;

dividing the light beams in the interferometer unit and transmitting them through two paths, each having an optical path length in the interferometer unit, such that one path contains light beams having the first frequency and the other path contains light beams having the second frequency; combining the light beams after they have traversed the two paths and producing an optical measuring beam having a phase which is proportional to any change in the optical path length occurring between the two paths, said change representing a change in a displacement to be measured by the interferometer unit;

producing a measuring signal representing the phase of the optical measuring beam; and comparing the phase of the reference signal and of the measuring signal so as to produce a phase difference which depends on the displacement to be measured;

wherein the step of producing a measuring signal comprises the production of first and second measuring signals representing light components which are orthogonal to each other; and wherein the step of comparing the phases comprises the production of first and second phase differences between one of the first and second measuring signals and the reference signal and the generation of a mean value of the two phase differences as a measure of the displacement to be measured.

6. A heterodyne interferometer arrangement comprising:

a light source producing light beams having first and second frequencies, respectively;

an interferometer unit having a non-linearity error and coupled to receive the light beams, said interferometer unit further including a first splitter for dividing the light beams and sending them along two paths, each having a respective optical path length, one path for transmitting a portion of the light beams having the first frequency and the other path for transmitting a portion of the light beams having the second frequency; the interferometer unit so constructed and arranged that the light beams after traveling through the two paths are recombined to produce an optical measuring beam having a phase which is proportional to any change in optical path length occurring between the two paths, said change representing a change in a displacement to be measured by the interferometer unit;

a second splitter coupled to receive and divide the optical measuring beam into two orthogonal light beams each having components which are orthogonal to one another;

first and second measuring transducer units, which are arranged to receive respectively the two orthogonal light beams and respondto produce first and second measuring signals; and a phase difference circuit coupled to receive the first and second measuring signals for producing a phase difference signal, which is representative of a phase difference between the first and second measuring signals and which is proportional to the non-linearity error of the interferometer unit.

7. A heterodyne interferometric metering method comprising the steps of:

generating light beams having first and second frequencies;

applying said light beams in an interferometer unit having a non-linearity error;

dividing the light beams in the interferometer unit and transmitting them through two paths, each having an optical path length in the interferometer unit, such that one path contains light beams having the first frequency and the other path contains light beams having the second frequency; combining the light beams after they have traversed the two paths and producing an optical measuring beam having a phase which is proportional to any change in the optical path length occurring between the two paths, said change representing a change in a displacement to be measured by the interferometer unit;

splitting the optical measuring beam into two orthogonal light beams each having components that are orthogonal to one another;

producing first and second measuring signals representative of the two orthogonal light beams; and producing a phase difference signal, which is representative of any phase difference between the first and second measuring signals and which is proportional to the non-linearity error of the interferometer unit.

* * * * *